United States Patent
Sigler et al.

(10) Patent No.: US 10,751,830 B2
(45) Date of Patent: Aug. 25, 2020

(54) WELDING ELECTRODE FOR USE IN A RESISTANCE SPOT WELDING WORKPIECE STACK-UPS THAT INCLUDE AN ALUMINUM WORKPIECE AND A STEEL WORKPIECE

(71) Applicant: GM GLOBAL TECHNOLOGY OPERATIONS LLC, Detroit, MI (US)

(72) Inventors: David R. Sigler, Shelby Township, MI (US); David S. Yang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 543 days.

(21) Appl. No.: 15/482,742

(22) Filed: Apr. 8, 2017

(65) Prior Publication Data

US 2017/0291248 A1   Oct. 12, 2017

Related U.S. Application Data

(60) Provisional application No. 62/319,835, filed on Apr. 8, 2016.

(51) Int. Cl.
| | | |
|---|---|---|
| *B23K 11/20* | (2006.01) | |
| *B23K 11/30* | (2006.01) | |
| *B23K 103/20* | (2006.01) | |

(52) U.S. Cl.
CPC .......... *B23K 11/20* (2013.01); *B23K 11/3018* (2013.01); *B23K 2103/20* (2018.08)

(58) Field of Classification Search
CPC .. B23K 11/20; B23K 11/3018; B23K 2103/20

(Continued)

(56) References Cited

U.S. PATENT DOCUMENTS

| | | | | |
|---|---|---|---|---|
| 2,379,187 A | * | 6/1945 | Richards | B23K 11/3009 |
| | | | | 219/119 |
| 4,760,235 A | * | 7/1988 | Flater | B23K 35/0205 |
| | | | | 219/119 |

(Continued)

FOREIGN PATENT DOCUMENTS

| | | |
|---|---|---|
| CN | 1946506 | 4/2007 |
| CN | 102059439 | 5/2011 |

(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

(Continued)

*Primary Examiner* — Thien S Tran
(74) *Attorney, Agent, or Firm* — Reising Ethington P.C.

(57) ABSTRACT

A welding electrode is disclosed that includes an electrode welding shell and a blind adapter that are joined together to cooperatively define an internal cavity. The electrode welding shell and the blind adapter may be integrally formed or they may be distinct components that are attached together. The presence of the internal cavity defined by the electrode welding shell and the blind adapter reduces the thermal mass of the welding electrode and slows the rate of conductive heat transfer from the weld face to a cooling fluid, which allows in the center of the weld face to retain heat for a longer duration once current flow through the welding electrode is terminated, thereby positively affecting the spot welding process for particular types of workpiece stack-ups including those that include an aluminum workpiece and an overlapping adjacent steel workpiece.

15 Claims, 6 Drawing Sheets

(58) Field of Classification Search
USPC .............. 219/85.16, 117.1, 119, 120, 121.52
See application file for complete search history.

(56) References Cited

U.S. PATENT DOCUMENTS

| | | | |
|---|---|---|---|
| 5,302,797 A | | 4/1994 | Yasuyama et al. |
| 5,304,769 A | | 4/1994 | Ikegami et al. |
| 5,387,774 A | * | 2/1995 | Boyer ................ B23K 11/3018 219/117.1 |
| 5,473,135 A | * | 12/1995 | Shimada ............ B23K 11/3018 219/120 |
| 5,783,794 A | | 7/1998 | Oikawa et al. |
| 6,037,559 A | | 3/2000 | Okabe et al. |
| 7,850,059 B2 | | 12/2010 | Kobayashi et al. |
| 7,935,908 B2 | | 5/2011 | Nakagawa et al. |
| 7,951,465 B2 | | 5/2011 | Urushihara et al. |
| 7,984,840 B2 | | 7/2011 | Kobayashi et al. |
| 8,020,749 B2 | | 9/2011 | Kobayashi et al. |
| 8,058,584 B2 | | 11/2011 | Miyamoto et al. |
| 8,487,206 B2 | | 7/2013 | Urushihara et al. |
| 8,502,105 B2 | | 8/2013 | Tanaka et al. |
| 9,676,065 B2 | | 6/2017 | Sigler et al. |
| 2005/0218121 A1 | | 10/2005 | Hayashi et al. |
| 2005/0247679 A1 | | 11/2005 | Wang |
| 2007/0212565 A1 | | 9/2007 | Urushihara et al. |
| 2009/0255908 A1 | | 10/2009 | Sigler et al. |
| 2011/0097594 A1 | | 4/2011 | Tanaka et al. |
| 2012/0021240 A1 | | 1/2012 | Urushihara et al. |
| 2013/0189023 A1 | | 7/2013 | Spinella |
| 2013/0263638 A1 | | 10/2013 | Gugel et al. |
| 2014/0305912 A1 | | 10/2014 | Taniguchi et al. |
| 2014/0360986 A1 | | 12/2014 | Sigler et al. |
| 2015/0053654 A1 | | 2/2015 | Sigler et al. |
| 2015/0053655 A1 | | 2/2015 | Sigler et al. |
| 2015/0083693 A1 | | 3/2015 | Schroth et al. |
| 2015/0096961 A1 | | 4/2015 | Carlson et al. |
| 2015/0096962 A1 | | 4/2015 | Sigler et al. |
| 2015/0231729 A1 | | 8/2015 | Yang et al. |
| 2015/0231730 A1 | | 8/2015 | Sigler et al. |
| 2015/0352658 A1 | | 12/2015 | Yang et al. |
| 2015/0352659 A1 | | 12/2015 | Sigler et al. |
| 2016/0016252 A1 | | 1/2016 | Edwards, II |
| 2016/0158874 A1 | | 6/2016 | Wang et al. |
| 2016/0279732 A1 | | 9/2016 | Sigler et al. |
| 2016/0288242 A1 | | 10/2016 | Sigler et al. |
| 2016/0346865 A1 | | 12/2016 | Sigler et al. |
| 2017/0008118 A1 | | 1/2017 | Yang et al. |
| 2017/0106466 A1 | | 4/2017 | Sigler et al. |
| 2017/0157697 A1 | | 6/2017 | Yang et al. |
| 2017/0225262 A1 | | 8/2017 | Sigler et al. |
| 2017/0225263 A1 | | 8/2017 | Sigler et al. |
| 2017/0232548 A1 | | 8/2017 | Carlson et al. |
| 2017/0252853 A1 | | 9/2017 | Wang et al. |
| 2017/0282303 A1 | | 10/2017 | Wang et al. |
| 2017/0291246 A1 | | 10/2017 | Sigler et al. |
| 2017/0291247 A1 | | 10/2017 | Sigler et al. |
| 2017/0297134 A1 | | 10/2017 | Sigler et al. |
| 2017/0297135 A1 | | 10/2017 | Sigler et al. |
| 2017/0297136 A1 | | 10/2017 | Brown et al. |
| 2017/0297137 A1 | | 10/2017 | Perry et al. |
| 2017/0297138 A1 | | 10/2017 | Sigler et al. |
| 2017/0304925 A1 | | 10/2017 | Sigler et al. |
| 2017/0361392 A1 | | 12/2017 | Sigler et al. |

FOREIGN PATENT DOCUMENTS

| | | |
|---|---|---|
| CN | 102114574 | 7/2011 |
| JP | 11342477 | 12/1999 |
| JP | 2011224578 | 11/2011 |
| JP | 2013151017 | 8/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

English translation of CN 102059439 to Mazda Motor (published May 18, 2011).

English translation JP 2011224578 to Kobe Steel (published Nov. 10, 2011).

English translation of JP2013151017 to Mazda Motor (published Aug. 8, 2013).

Haselhuhn et al., U.S. Appl. No. 15/807,219 entitled "Electrode Weld Face Design," filed Nov. 8, 2017.

Sigler et al., U.S. Appl. No. 15/907,996 entitled "Improving Mechanical Performance of Al-Steel Weld Joints by Limiting Steel Sheet Deformation," filed Feb. 28, 2018.

Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.

Sigler et al., U.S. Appl. No. 15/976,163 entitled "Multi-Step Direct Welding of an Aluminum-Based Workpiece to a Steel Workpiece," filed May 10, 2018.

Yang et al., U.S. Appl. No. 15/992,748 entitled "Electrode for Resistance Spot Welding of Dissimilar Metals," filed May 30, 2018.

* cited by examiner ns structure.

WELDING ELECTRODE FOR USE IN A RESISTANCE SPOT WELDING WORKPIECE STACK-UPS THAT INCLUDE AN ALUMINUM WORKPIECE AND A STEEL WORKPIECE

CROSS-REFERENCE TO RELATED APPLICATION(S)

This application claims the benefit of U.S. Provisional Application No. 62/319,835 filed on Apr. 8, 2016. The entire contents of the aforementioned provisional application are incorporated herein by reference.

TECHNICAL FIELD

The technical field of this disclosure relates generally to resistance spot welding and, more particularly, to resistance spot welding an aluminum workpiece and an adjacent overlapping steel workpiece.

INTRODUCTION

Resistance spot welding is a process used by a number of industries to join together two or more metal workpieces. The automotive industry, for example, often uses resistance spot welding to join together metal workpieces during the manufacture of vehicle structural frame members (e.g., body sides and cross-members) and vehicle closure members (e.g., vehicle doors, hoods, trunk lids, and lift gates), among others. A number of spot welds are often formed at various points around a peripheral edge of the metal workpieces or some other bonding region to ensure the part is structurally sound. While spot welding has typically been practiced to join together certain similarly composed metal workpieces—such as steel-to-steel and aluminum-to-aluminum—the desire to incorporate lighter weight materials into a vehicle body structure has generated interest in joining steel workpieces to aluminum workpieces by resistance spot welding. The aforementioned desire to resistance spot weld such dissimilar metal workpieces is not unique to the automotive industry; indeed, it extends to other industries including the aviation, maritime, railway, and building construction industries.

Resistance spot welding relies on the flow of electrical current through overlapping metal workpieces and across their faying interface(s) to generate the heat needed for welding. To carry out such a welding process, a set of opposed welding electrodes is pressed in facial alignment against opposite sides of the workpiece stack-up, which typically includes two or three metal workpieces arranged in a lapped configuration. Electrical current is then passed through the metal workpieces from one welding electrode to the other. Resistance to the flow of this electrical current generates heat within the metal workpieces and at their faying interface(s). When the workpiece stack-up includes an aluminum workpiece and an adjacent overlapping steel workpiece, the heat generated at the faying interface and within the bulk material of those dissimilar metal workpieces initiates and grows a molten aluminum weld pool within the aluminum workpiece. The molten aluminum weld pool wets the adjacent faying surface of the steel workpiece and, upon termination of the current flow, solidifies into a weld joint that weld bonds the two workpieces together.

In practice, however, spot welding an aluminum workpiece to a steel workpiece is challenging since a number of characteristics of those two metals can adversely affect the strength—most notably the peel and cross-tension strength—of the weld joint. For one, the aluminum workpiece usually contains a mechanically tough, electrically insulating, and self-healing refractory oxide surface layer. This oxide surface layer is typically comprised of aluminum oxide compounds, but may include other metal oxide compounds as well, including those of magnesium oxide when the aluminum workpiece is composed, for example, of a magnesium-containing aluminum alloy. As a result of its properties, the refractory oxide surface layer has a tendency to remain intact at the faying interface where it not only hinders the ability of the molten aluminum weld pool to wet the steel workpiece, but also provides a source of near-interface defects within the growing weld pool. Furthermore, the insulating nature of the refractory oxide surface layer raises the electrical contact resistance of the aluminum workpiece—namely, at its faying surface and at its electrode contact point—making it difficult to effectively control and concentrate heat within the aluminum workpiece.

Apart from the challenges presented by the refractory oxide surface layer of the aluminum workpiece, the aluminum workpiece and the steel workpiece possess different properties that can adversely affect the strength and properties of the weld joint. Specifically, aluminum has a relatively low melting point (~600° C.) and relatively low electrical and thermal resistivities, while steel has a relatively high melting point (~1500° C.) and relatively high electrical and thermal resistivities. As a consequence of these differences in material properties, most of the heat is generated within the steel workpiece during current flow such that a heat imbalance exists between the steel workpiece (higher temperature) and the aluminum workpiece (lower temperature). The combination of the heat imbalance created during current flow and the high thermal conductivity of the aluminum workpiece means that, immediately after the electrical current flow is terminated, a situation occurs where heat is not disseminated symmetrically from the weld zone. Instead, heat is conducted from the hotter steel workpiece through the aluminum workpiece towards the welding electrode on the other side of the aluminum workpiece, which creates a steep thermal gradient in that direction.

The development of a steep thermal gradient between the steel workpiece and the welding electrode on the other side of the aluminum workpiece is believed to weaken the resultant weld joint in several ways. First, because the steel workpiece retains heat for a longer duration than the aluminum workpiece after the flow of electrical current has terminated, the molten aluminum weld pool solidifies directionally, starting from the region proximate the colder welding electrode (often water cooled) associated with the aluminum workpiece and propagating towards the faying surface of the steel workpiece. A solidification front of this kind tends to sweep or drive defects—such as gas porosity, shrinkage voids, and micro-cracking—towards and along the bonding interface of the weld joint and the steel workpiece where residual oxide film defects are already present. The residual oxide film defects can be particularly disruptive if combined with thermal decomposition residuals from either an adhesive layer or other organic material layer that may be present between the aluminum and steel workpieces. Second, the sustained elevated temperature in the steel workpiece promotes the growth of a hard and brittle Fe—Al intermetallic layer within the weld joint and contiguous with the faying surface of the steel workpiece. Having a dispersion of weld defects together with excessive growth of the Fe—Al intermetallic layer at the bonding interface tends to reduce the peel and cross-tension strength of the weld joint.

In light of the aforementioned challenges, previous efforts to spot weld an aluminum workpiece and a steel workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners including self-piercing rivets and flow-drill screws have predominantly been used instead. Mechanical fasteners, however, take longer to put in place and have high consumable costs compared to spot welding. They also add weight to the vehicle—weight that is avoided when joining is accomplished by way of spot welding—that offsets some of the weight savings attained through the use of an aluminum workpiece in the first place. Advancements in spot welding that would make it easier to join aluminum and steel workpieces would thus be a welcome addition to the art.

SUMMARY

A welding electrode for use in spot welding operations may, according to one embodiment of the present disclosure, include an electrode welding shell and a blind adapter. The electrode welding shell includes a front end wall and a peripheral side wall. The front end wall exteriorly comprises a weld face and the peripheral side wall extends rearwards from the front end wall. The blind adapter is joined to the peripheral side wall such that the electrode welding shell and the blind adapter cooperate to define an internal cavity. The blind adapter has an axially closed front wall surrounded by a rearward portion of the peripheral side wall of the electrode welding shell. The axially closed front wall of the blind adapter has an exterior front surface that partially defines the internal cavity.

The welding electrode of the aforementioned embodiment may include additional features. For example, the electrode welding shell and the blind adapter may be integrally formed. As another example, the electrode welding shell and the blind adapter may be distinct components that are attached together. Still further, the axially closed front wall of the blind adapter and a peripheral side wall of the blind adapter define an internal recess. In that regard, the blind adapter may be configured so that part of the internal recess of the blind adapter proximate the closed front wall serves as a cooling pocket when an electrode shank adapter is supported in the internal recess of the blind adapter. Similarly, an electrode shank adapter may actually be supported in the internal recess such that a part of the internal recess proximate the closed front wall serves as a cooling pocket. The blind adapter and the electrode shank adapter may be integrally formed but that is not necessarily required.

The welding electrode of the aforementioned embodiment may also include a certain weld face design. For instance, the weld face may include a plurality of upstanding circular ridges that are centered about and surround an axis of the weld face. The upstanding circular ridges increase in diameter from an innermost ridge that immediately surrounds the axis of the weld face to an outermost ridge farthest away from the axis of the weld face. Each of the upstanding circular ridges may have a closed circumference. As another feature of the welding electrode, the peripheral side wall of the electrode welding shell may extend rearward away from the front end wall coaxially along an axis of the weld face. Moreover, each of the electrode welding shell and the blind adapter may be constructed from a material having an electrical conductivity of at least 45% IACS and a thermal conductivity of at least 180 W/mK. The internal cavity defined by the electrode welding shell and the blind adapter may be vacant or filled with a low conductivity material that has an electrical conductivity and a thermal conductivity that are less than an electrical conductivity and a thermal conductivity of each of the electrode welding shell and the blind adapter.

A welding electrode for use in spot welding operations may, according to another embodiment of the present disclosure, include an electrode welding shell and a blind adapter. The electrode welding shell includes a front end wall and a peripheral side wall. The front end wall exteriorly comprises a weld face and the peripheral side wall extends rearwards from the front end wall to a back end of the shell. The blind adapter includes an axially closed front wall and a peripheral side wall that extends away from the axially closed front wall to define an internal recess. The peripheral side wall of the blind adapter is joined to the peripheral side wall of the electrode welding shell such that the peripheral side wall of the blind adapter and the peripheral side wall of the electrode welding shell overlap and the axially closed front wall of the blind adapter is surrounded by the peripheral side wall of the electrode welding shell. In this way, an exterior front end surface of the axially closed front wall of the blind adapter cooperates with an interior surface of the peripheral side wall of the electrode welding shell and an interior back surface of the front end wall of the electrode welding shell to define an internal cavity. Moreover, a part of the internal recess of the blind adapter proximate the axially closed front wall serves as a cooling pocket when an electrode shank adapter is supported in the internal recess of the blind adapter.

The welding electrode of the aforementioned embodiment may include additional features. For example, the electrode welding shell and the blind adapter may be integrally formed. As another example, the electrode welding shell and the blind adapter may be distinct components that are attached together. Still further, the peripheral side wall of the electrode welding shell may include a rearward wall portion adjacent to the back end of the electrode welding shell in which the interior surface of the peripheral side wall of the electrode welding shell tapers from an entrance to the back end of the electrode welding shell. Likewise, an exterior side surface of the peripheral side wall of the blind adapter may be tapered to match that of the interior surface of the peripheral side wall of the electrode welding shell within the rearward portion in order to establish an interference fit between the electrode welding shell and the blind adapter.

A method of resistance spot welding a workpiece stack-up that comprises an aluminum workpiece and an adjacent overlapping steel workpiece according to yet another embodiment of the present disclosure may include several steps. In one step, an aluminum workpiece surface of the workpiece stack-up may be contacted with a first weld face of a first welding electrode. The first welding electrode may comprise an electrode welding shell, which includes the first weld face, and a blind adapter joined to the electrode welding shell at one end and further joined to an electrode shank adapter at another end. The electrode welding shell and the blind adapter cooperate to define an internal cavity, and the blind adapter and the electrode shank adapter cooperate to define a cooling pocket. In another step, a steel workpiece surface of the workpiece stack-up is contacted with a second weld face of a second welding electrode. In another step, electrical current may be passed between the first weld face of the first welding electrode and the second weld face of the second welding electrode to create a molten aluminum weld pool within the aluminum workpiece that wets an adjacent faying surface of the steel workpiece. In yet another step, a flow of cooling fluid may be introduced into the cooling pocket through the electrode shank adapter to extract heat away from the first weld face of the first welding electrode during passage of the electrical current between the first and second weld faces of the first and second welding electrodes. In still another step, passage of the electrical current between the first weld face of the first welding electrode and the second weld face of the second welding electrode is terminated to allow the molten aluminum weld pool to solidify into a weld joint that bonds the aluminum and steel workpieces together.

The method of the aforementioned embodiment may be further defined. For example, heat from the first weld face may be conducted circuitously around the internal cavity defined by the electrode welding shell and the blind adapter in order to be extracted from the first welding electrode by the flow of cooling fluid introduced into the cooling pocket. As another example, the electrode welding shell may include a front end wall and a peripheral side wall. The front end wall may exteriorly comprise the first weld face and the peripheral side wall may extend rearwards from the front end wall. Additionally, the blind adapter may have an axially closed front wall surrounded by the peripheral side wall of the electrode welding shell such that an exterior front surface of the axially closed front wall of the blind adapter cooperates with an interior surface of the peripheral side wall of the electrode welding shell and an interior back surface of the front end wall of the electrode welding shell to define the internal cavity.

The first welding electrode employed in the method of the aforementioned embodiment may have additional features. For instance, the blind adapter and the electrode shank adapter that cooperate to define the cooling pocket may be integrally formed. Additionally, the first weld face may include a plurality of upstanding circular ridges that are centered about and surround an axis of the first weld face. The upstanding circular ridges increase in diameter from an innermost ridge that immediately surrounds the axis of the first weld face to an outermost ridge farthest away from the axis of the first weld face. Each of the upstanding circular ridges may have a closed circumference.

DETAILED DESCRIPTION

Figure 1:
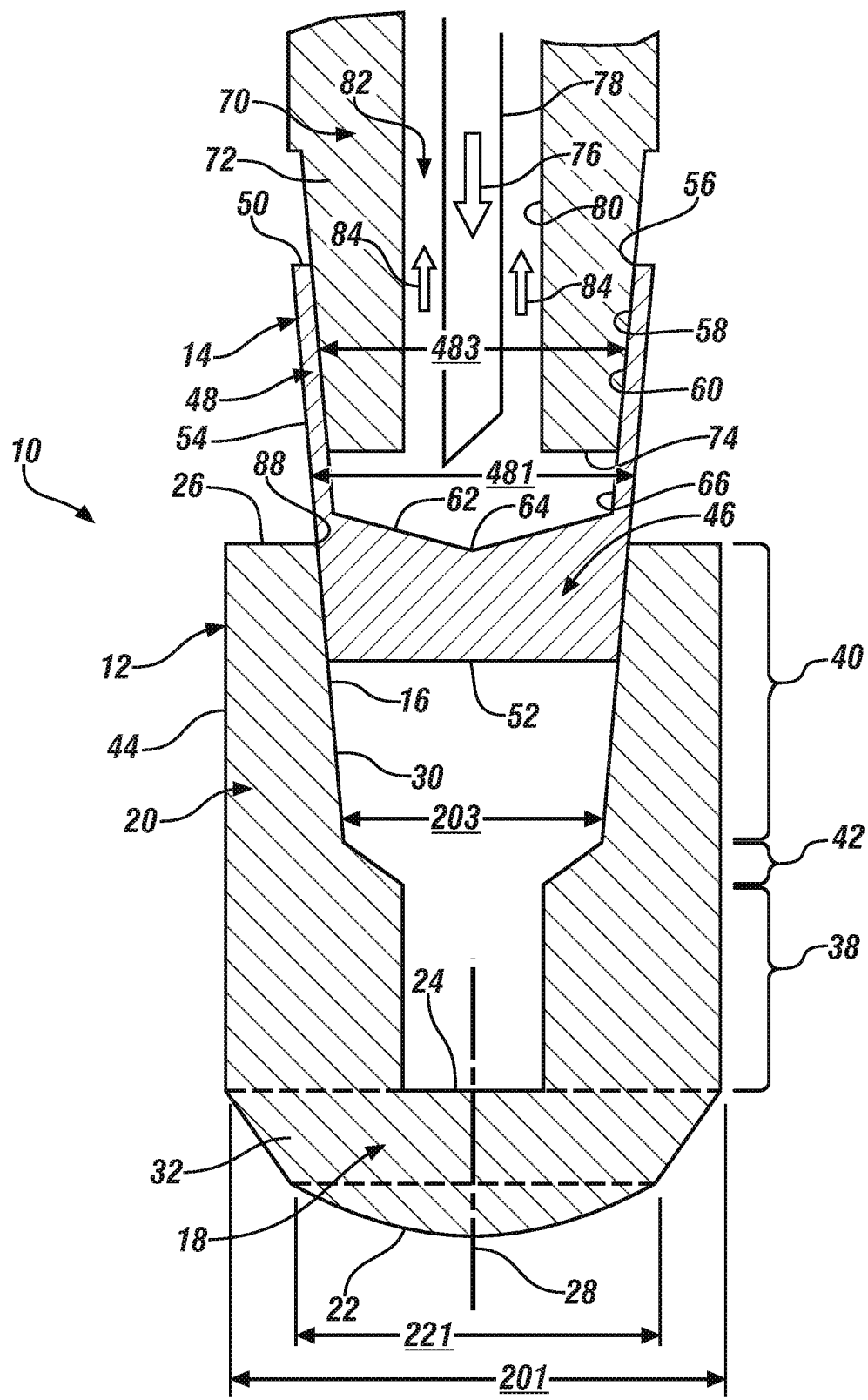
FIG. 1 is a cross-sectional view of a welding electrode suitable for resistance spot welding operations according to one embodiment of the present disclosure.
Figure 2:
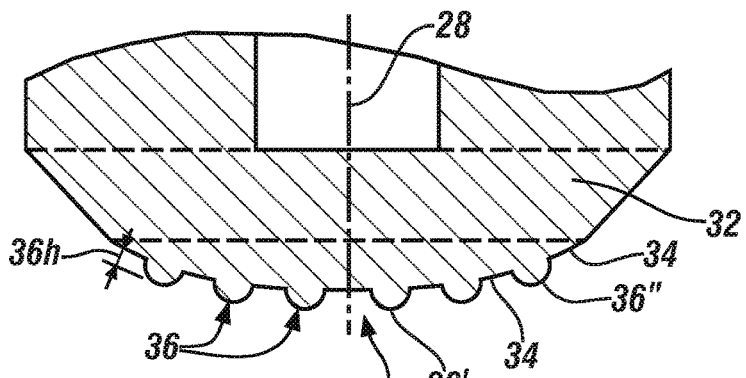
FIG. 2 is a magnified cross-sectional view of one embodiment of a weld face configuration that may be employed with the welding electrode shown in FIG. 1.
Figure 3:
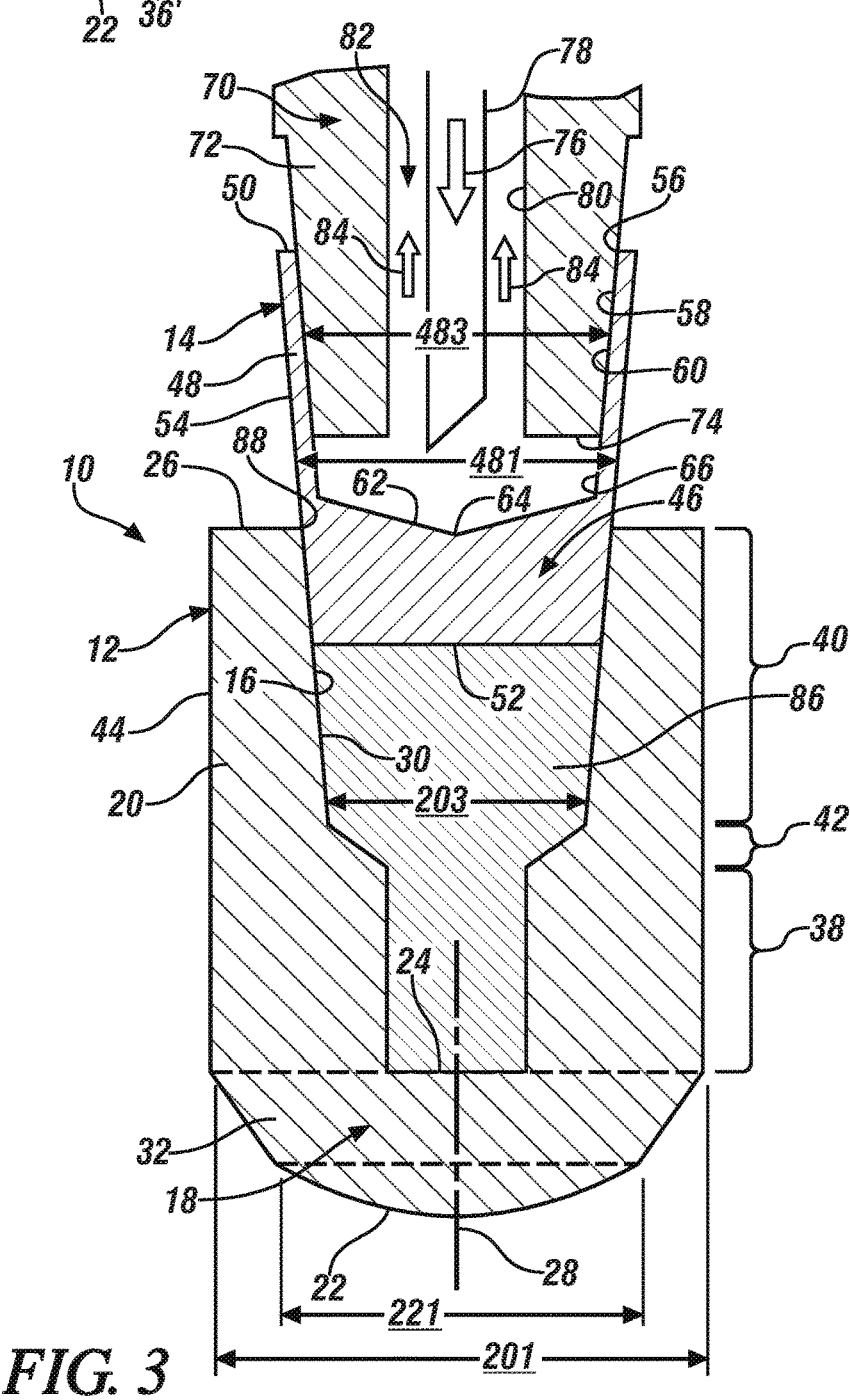
FIG. 3 is a cross-sectional view of a welding electrode suitable for resistance spot welding operations according to another embodiment of the present disclosure.

A welding electrode that is useful in resistance spot welding applications is represented by reference numeral 10 in FIGS. 1-3. In particular, the welding electrode 10 may be used to spot weld a workpiece stack-up that includes at least an aluminum workpiece and an adjacent overlapping steel workpiece, as will be described in more detail below with reference to FIGS. 4-6. For example, the welding electrode 10 is operable to spot weld a "2T" workpiece stack-up (FIG. 4) that includes only the adjacent and overlapping pair of aluminum and steel workpieces (as far as the number of workpieces are concerned). Other workpiece stack-up configurations are of course amenable to spot welding in a similar way. Indeed, the welding electrode 10 is also operable to spot weld a "3T" workpiece stack-up (FIGS. 5-6) that includes the adjacent and overlapping pair of aluminum and steel workpieces plus an additional aluminum workpiece or an additional steel workpiece so long as the two workpieces of the same base metal composition are disposed next to each other (i.e., aluminum-aluminum-steel or aluminum-steel-steel) within the stack-up. The welding electrode 10 may even be used to weld "4T" workpiece stack-ups (i.e., aluminum-aluminum-steel-steel, aluminum-aluminum-aluminum-steel, or aluminum-steel-steel-steel).

Referring now to FIG. 1, the welding electrode 10 includes an electrode welding shell 12 and a blind adapter 14 that, together, cooperate to define an internal cavity 16. The electrode welding shell 12 and the blind adapter 14 may be integrally formed in that they are manufactured from a single piece of raw material. In other embodiments, however, the electrode welding shell 12 and the blind adapter 14 are not integrally formed but, rather, are distinct components that are attached by way of interference fit, laser welding, or some other attachment mechanism suitable for attaching separately manufactured items. In that regard, the blind adapter 14 may be a distinct piece that is independently attachable to an electrode shank adapter on one end and the electrode welding shell 12 on the other end or, in yet another implementation, the blind adapter 14 may be integrally formed to an electrode shank adapter and be attachable to the electrode welding shell 12. In order to adequately conduct electrical current and heat during resistance spot welding applications, each of the electrode welding shell 12 and the blind adapter 14 is constructed form a material having an electrical conductivity of between 45% and 100% IACS (100% IACS being equal to $5.80 \times 10^7$ S/m), or more narrowly between 75% and 95% IACS, and a thermal conductivity of at least 180 W/mK.

The electrode welding shell 12 is a U-shaped structure in cross-section that includes a front end wall 18 and a peripheral side wall 20. The front end wall 18 exteriorly comprises a weld face 22 which, as discussed in greater detail below, is the section of the welding electrode 10 that experiences pressed contact with an aluminum workpiece during spot welding. The front end wall 18 also includes an interior back surface 24 opposite the weld face 22. The peripheral side wall 20 surrounds the interior back surface 24 of the front end wall 18 and extends rearwards to a back end 26 of the welding shell 12. The peripheral side wall 20 may extend away from the front end wall 18 coaxially along an axis 28 of the weld face 22, as shown here in FIG. 1, or it may include a bend that angles part of the wall 20 relative to the weld face axis 28. The peripheral side wall 20 includes an interior surface 30 that extends from the interior back surface 24 of the front end wall 18 towards an entrance 88 at the back end 26 of the shell 12.

The weld face 22 is designed to forcibly contact and exchange electrical current through an aluminum workpiece during resistance spot welding of a workpiece stack-up that includes superimposed aluminum and steel workpieces. The weld face 22 may be upwardly displaced by a transition nose 32 or it may span the entire front end wall 18 (termed a "full face electrode"). The weld face 22 has a diameter 22I that preferably lies within the range of 8 mm to 22 mm or, more narrowly, within the range of 10 mm to 15 mm. Moreover, if a transition nose 32 is present, the transition nose 32 may upwardly displace the weld face 22 in a direction away from the peripheral side wall 20 by a distance of 2 mm to 10 mm. The transition nose 32 is preferably frustoconical or truncated spherical in shape. If frustoconical, the angle of truncation of the nose 32 is preferably between 30° and 60° from a horizontal plane of the weld face 22. If truncated spherical, the radius of curvature of the nose 32 is preferably between 6 mm and 12 mm.

A broad range of electrode weld face designs may be implemented for the welding electrode 10. The weld face 22, for example, and referring now to FIG. 2, may include a base weld face surface 34 that is planar or convexly domed. If convexly domed, the base weld face surface 34 ascends from an outer circumference of the weld face 22 and, in one embodiment, may have a spherical profile with a radius of curvature that ranges from 15 mm to 300 mm or, more narrowly, from 20 mm to 50 mm. Moreover, regardless of whether the base weld face surface 34 is planar or convexly domed, the base weld face surface 34 may be smooth or roughened. The weld face 22 may also include a central projection such as a raised plateau or spherical ball-nose projection centered about the weld face axis 28. Still further, the weld face 22 may include a series of upstanding concentric rings of circular ridges that project outwardly from the base weld face surface 34 such as the ridges disclosed in U.S. Pat. Nos. 8,222,560; 8,436,269; 8,927,894; or in U.S. Pat. Pub. 2013/0200048.

In a preferred embodiment of the welding electrode 10, the weld face 22 includes a plurality of upstanding circular ridges 36 that are centered about and surround the weld face axis 28, as shown in FIG. 2. The base weld face surface 34 accounts for 50% or greater, and preferably between 50% and 80%, of the surface area of the weld face 22, and the remaining surface area of the weld face 22 is attributed to the plurality of upstanding circular ridges 36. While the number of upstanding circular ridges 36 present on the base weld face surface 34 may vary, the weld face 22 preferably includes anywhere from two to ten ridges 36, or more narrowly from three to five ridges 36. The several upstanding circular ridges 36 are radially spaced apart from each other by intervening annular portions of the base weld face surface 34 such that the upstanding ridges 36 become larger in diameter when moving from an innermost upstanding ridge 36' that immediately surrounds the weld face axis 28 to an outermost upstanding ridge 36" that is farthest away from the weld face axis 28.

The size and shape of the upstanding circular ridges 36 are designed to improve mechanical stability and reduce the electrical and thermal contact resistance at the electrode/workpiece junction while at the same time being easily redressable. In one embodiment, as shown, each of the upstanding circular ridges 36 has a closed circumference, meaning that each ridge 36 is continuously curved when viewed from above such that its circumference is not interrupted. Additionally, the cross-sectional profile of each ridge 36 may lack sharp corners and have a curved (as shown in FIG. 2) or flat top surface. Each of the circular ridges 36 also has a ridge height 36h—taken at the midpoint of the ridge 36—that extends upwards and is positively displaced from the base weld face surface 34 when viewed in cross-section. The ridge height 36h of each ridge 36 preferably ranges from 20 μm to 400 μm or, more narrowly, from 50 μm to 300 μm. And the spacing of the ridges 36 measured between the centers of each pair of adjacent neighboring ridges 36 preferably ranges from 50 μm to 1800 μm or, more narrowly, from 80 μm to 1500 μm.

The peripheral side wall 20 may be constructed in a variety of ways which, consequently, may influence the profile of the interior surface 30 of the side wall 20. In the specific implementation shown here, the peripheral side wall 20 includes a forward wall portion 38 adjacent to the front end wall 18 of the welding shell 12, a rearward wall portion 40 adjacent to the back end 26 of the welding shell 12, and an intermediate wall portion 42 that joins the forward and rearward wall portions 38, 40. The three wall portions 38, 40, 42 provide the peripheral side wall 20 with the interior surface 30 and an exterior surface 44. The exterior surface 44 is preferably cylindrical in shape with a constant diameter 201 across all three wall portions 38, 40, 42. And, given the desired diameter 221 of the weld face 22 (8 mm to 22 mm), the diameter 201 of the cylindrical exterior surface 44 of the peripheral side wall 20 preferably ranges from 12 mm to 22 mm or, more narrowly, from 16 mm to 20 mm.

The three wall portions 38, 40, 42 that constitute the peripheral side wall 20 may differ in thickness. For instance, as shown here, the interior surface 30 tapers within the rearward wall portion 40 when moving from the entrance 88 of the back end 26 of the welding shell 12 towards the intermediate wall portion 42. The interior surface 30 continues to taper within the intermediate wall portion 42, albeit more rapidly, when transitioning from the rearward wall portion 40 to the front wall portion 38. And, finally, the interior surface 30 attains a constant cross-section within the forward wall portion 38 when moving from the intermediate wall portion 42 to the front end wall 18 of the welding shell 12. These thickness variances cause a diameter 203 of the interior surface 30 to taper from between 14 mm to 18 mm at the entrance 88 to the back end 26 of the electrode welding shell 12 at a taper angle of between 1° and 3° up until the transition between the rearward wall portion 40 and the intermediate wall portion 42. The diameter 203 further decreases to between 0.5 mm and 10 mm at the transition between the intermediate wall portion 42 and the forward wall portion 38 and then remains constant at between 0.5 mm and 10 mm until the interior surface 30 meets the interior back surface 24 of front end wall 18.

In an alternative embodiment of the peripheral side wall 20—of which there are many—the forward wall portion 38 and the intermediate wall portion 40 as previously described are not present. Rather, the rearward wall portion 40 simply extends from the back end 26 of the welding shell 12 all the way to the front end wall 18 of the welding shell 12. When the peripheral side wall 20 is constructed in this way, the diameter 203 of the interior surface 30 tapers from between 14 mm to 18 mm at the entrance 88 of the back end 26 of the electrode welding shell 12 at a taper angle of between 1° and 3°. This taper continues until the rearward wall portion 40 of the peripheral side wall 20 meets the front end wall 18. Other configurations of the peripheral side wall 20 are certainly possible in addition to the embodiments described here given the multitude of configurations and profiles that may be imparted to the peripheral side wall 20 and its interior surface 30.

The blind adapter 14 is received through the entrance 88 of the back end 26 of the peripheral side wall 20 and is joined to the peripheral side wall 20. The blind adapter 14 includes an axially closed front wall 46 and a peripheral side wall 48 that extends away from the closed front wall 46 to an open mounting base 50. The closed front wall 46 has an exterior front surface 52 and the peripheral side wall 48 has an exterior side surface 54 that extends from the open mounting base 50 to the exterior front surface 52. When the electrode welding shell 12 and the blind adapter 14 are joined—either by being integrally formed or by being separate and distinct parts that have been attached together—the closed front wall 46 is surrounded by the rearward wall portion 40 of the peripheral side wall 20 of the electrode welding shell 12. To that end, the internal cavity 16 of the welding electrode 10 is cooperatively defined by the back surface 24 of front end wall 18 of the electrode welding shell 12, the interior surface 30 of the peripheral side wall 20 of the welding shell 12, and the exterior front surface 52 of the closed front wall 46 of the blind adapter 14.

The closed front wall 46 of the blind adapter 14 is positioned past the entrance 88 of the back end 26 of the electrode welding shell 12. This results in joined overlap between the exterior side surface 54 of the peripheral side wall 48 of the blind adapter 14 and the interior surface 30 of peripheral side wall 20 of the electrode welding shell 12. The exterior side surface 54 of the peripheral side wall 48 of the blind adapter 14 is preferably complimentary in size and cross-sectional shape to the interior surface 30 of the peripheral side wall 20 of the electrode welding shell 12 at the rearward wall portion 40, at least where the two surfaces 30, 54 are joined. As such, in a preferred embodiment, the exterior side surface 54 of the peripheral side wall 48 tapers with a decreasing diameter 481 to match the taper of the interior surface 30 of the peripheral side wall 20 at the rearward wall portion 40 to enable the electrode welding shell 12 and the blind adapter 14 to be interference fit together when they are distinct components. The diameters 203, 481 of the two surfaces 30, 54 are thus virtually the same where they overlap and join.

The open mounting base 50 of the blind adapter 14 supports joining of the welding electrode 10 to an electrode shank adapter carried by a weld gun. In a preferred embodiment, as shown best in FIG. 1, the mounting base 50 has an opening 56, which is defined and surrounded by the peripheral side wall 48, to an internal recess 58 of the blind adapter 14. The internal recess 58 is defined by an interior side surface 60 that extends from the opening 56 to a bottom surface 62 that establishes a depth 64 of the internal recess 58. The interior side surface 60 provides the internal recess 58 with a diameter 483 that may be constant or variable as the side surface 60 extends towards the depth 64 of the recess 58. For example, as shown here in FIG. 1, the interior side surface 60 tapers from the opening 56. Specifically, the diameter 483 of the internal recess 58 may range from 10 mm to 20 mm or, more narrowly, from 14 mm to 18 mm at the opening 56, and may decrease when moving from the opening 56 to the transition of the interior side surface 60 and the bottom surface 62 using a taper angle of between 1% and 3%.

A part of the internal recess 58 proximate the closed front wall 46 of the blind adapter 14 serves as a cooling pocket 66 for the welding electrode 10. The cooling pocket 66 receives a flow of cooling fluid—typically water—during spot welding operations to extract heat away from the weld face 22. The ability to extract heat away from the weld face 22 helps counteract degradation mechanisms (e.g., contamination buildup and plastic deformation) that may occur at the weld face 22 during spot welding and, as a result, can preserve the workable lifetime of the welding electrode 10 and reduce the need to redress the weld face 22. The cooling pocket 66 shown here in FIG. 1 is bound by the bottom surface 62 and a section of the interior side surface 60 extending part of the way from the bottom surface 62 to the opening 56 of the internal recess 58. The bottom surface 62 in this embodiment, moreover, tapers inward from the interior side surface 60 down to the depth 64 of the internal recess 58 to define a conical cup.

The open mounting base 50 of the blind adapter 14 can be joined to a shank adapter 70 carried by a weld gun arm. The shank adapter 70, as shown, includes an outer casing 72 having a taper that matches the taper of the interior side surface 60 of the internal recess 58. The complimentary fitting nature of the outer casing 72 and the internal recess 58 allows the outer casing 72 to be received through the opening 56 and to frictionally engage the interior side surface 60. The outer casing 72 and the interior side surface 60 are forcibly slid in opposite directions relative to one another to advance a front end 74 of the outer casing 72 into the internal recess 58 and towards the depth 64 of the internal recess 58. Such forced frictional advancement of the outer casing 72 establishes an interference fit that prevents both axial and rotational movement between the shank adapter 70 and the internal recess 58 during spot welding applications. Of course, other techniques for joining the shank adapter 70 within the internal recess 58 may be used in addition to or in lieu of an interference fit as described above. Indeed, as mentioned above, the blind adapter 14 and the shank adapter 70 may be integrally formed.

The cooling pocket 66, as discussed above, is bound by the bottom surface 62 of the internal recess 58 and the section of the interior side surface 60 that extends part of the way from the bottom surface 62 to the opening 56. The cooling pocket 66 is also bound transversely across the internal recess 58 by the front end 74 of the shank adapter 70 once the shank adapter 70 is joined to the blind adapter 14 in the internal recess 58. In this way, a flow 76 of cooling fluid can be introduced into the cooling pocket 66 through a cooling fluid supply tube 78 located within an internal bore 80 defined by the outer casing 72 of the shank adapter 70. An annular space 82 of the internal bore 80 that fluidly communicates with the cooling pocket 66 and surrounds the cooling fluid supply tube 78 functions as a cooling fluid return channel; that is, as the flow 76 of cooling fluid enters the cooling pocket 66, a cooling fluid outflow 84 is forced out of the cooling pocket 66 and into the cooling fluid return channel where it (along with any acquired heat) is carried away from the welding electrode 10.

Compared to a conventional direct water-cooled cylindrical welding electrode, the existence of the internal cavity 16 slows the rate of conductive heat transfer between the weld face 22 and the cooling fluid in the cooling pocket 66. This causes the welding electrode 10, especially the front end wall 18 of the electrode welding shell 12, to run hotter when current is flowing through the electrode 10 and to retain heat for a longer duration once current flow has terminated. Such thermal behavior is due to the fact that any heat present at the weld face 22 has to be conducted circuitously around the internal cavity 16 by being transferred through the peripheral side wall 20 of the electrode welding shell 12 and into the closed front wall 46 of the blind adapter 14 in order to be extracted from the electrode 10 by the cooling fluid in the cooling pocket 66. And since heat flow is directed into the peripheral side wall 20 through the perimeter of the weld face 22, the center of the weld face 22 will experience a higher temperature than the perimeter of the weld face 22, which helps ensure that a corresponding central region of the molten aluminum weld pool is the last to solidify. By retaining heat in the weld face 22, and in particular at the center of the weld face 22, for a longer period following termination of current flow, the solidification behavior of the molten aluminum weld pool is affected in a way that consolidates weld defects into the center of the weld joint away from the notch root where they are less likely to degrade the mechanical properties of the joint.

The electrode welding shell 12 and the blind adapter 14 may be constructed from a variety of materials that have an electrical conductivity of at least 45% IACS and a thermal conductivity of at least 180 W/mK. Some material classes that fit these criteria include copper alloys, oxide-dispersion strengthened copper materials, and refractory-based materials that includes at least 35 wt %, and preferably at least 50 wt %, of a refractory metal. Specific examples of suitable materials include a copper-zirconium alloy, a copper-chromium alloy, a copper-chromium-zirconium alloy, copper containing a dispersion of aluminum oxide, and a refractory-based metal composite that includes a molybdenum or tungsten particulate phase. A few specific and preferred materials include a zirconium-copper alloy (ZrCu) that contains 0.10 wt % to 0.20 wt % zirconium and the balance copper, and a tungsten-copper metal composite that contains between 50 wt % and 90 wt % of a tungsten particulate phase dispersed in copper matrix that constitutes the balance (between 50 wt % and 10 wt %) of the composite. Other materials not expressly listed here that meet the applicable electrical and thermal conductivity standards may, of course, also be used as well.

The internal cavity 16 may function as intended to slow heat conduction from the weld face 22 to the cooling fluid in the cooling pocket 66 by being vacant (i.e., filled with air or under vacuum), as shown in FIG. 1, or by being filled with a low conductivity material 86, as shown in FIG. 3. The low conductivity material 86, if present, has an electrical conductivity and a thermal conductivity that are less than the electrical conductivity and the thermal conductivity of each of the electrode welding shell 12 and the blind adapter 14 components of the welding electrode 10. A multitude of materials can be used as the low conductivity material 86. Some notable examples include low electrical/thermal conductivity metals and alloys such as low carbon steels, tool steel, stainless steels, cupronickel metals, Hastelloy® metals, Inconel® metals, and titanium. Other suitable examples include electrical insulators such as alumina, fused silica, cordierite, porcelains, and polytetrafluoroethylene (e.g., Teflon®).

Referring now to FIGS. 4-11, the welding electrode 10 may be used to resistance spot weld a workpiece stack-up 90 that comprises at least an aluminum workpiece 92 and a steel workpiece 94 that overlap and lie adjacent to one another at a weld site 96. Indeed, as will be described in greater detail below, the disclosed spot welding method is broadly applicable to a wide variety of workpiece stack-up configurations that include the adjacent pair of aluminum and steel workpieces 92, 94. The workpiece stack-up 90 may, for example, include only the aluminum workpiece 92 and the steel workpiece 94 (as far as the number of workpieces present), or it may include an additional aluminum workpiece (aluminum-aluminum-steel) or an additional steel workpiece (aluminum-steel-steel) so long as the two workpieces of the same base metal composition are disposed next to each other in the stack-up 90. The workpiece stack-up 90 may even include more than three workpieces such as an aluminum-aluminum-steel-steel stack-up, an aluminum-aluminum-aluminum-steel stack-up, or an aluminum-steel-steel-steel stack-up. The aluminum and steel workpieces 92, 94 may be worked or deformed before or after being assembled into the workpiece stack-up 90 depending on the part being manufactured and the specifics of the overall manufacturing process.

Figure 4:
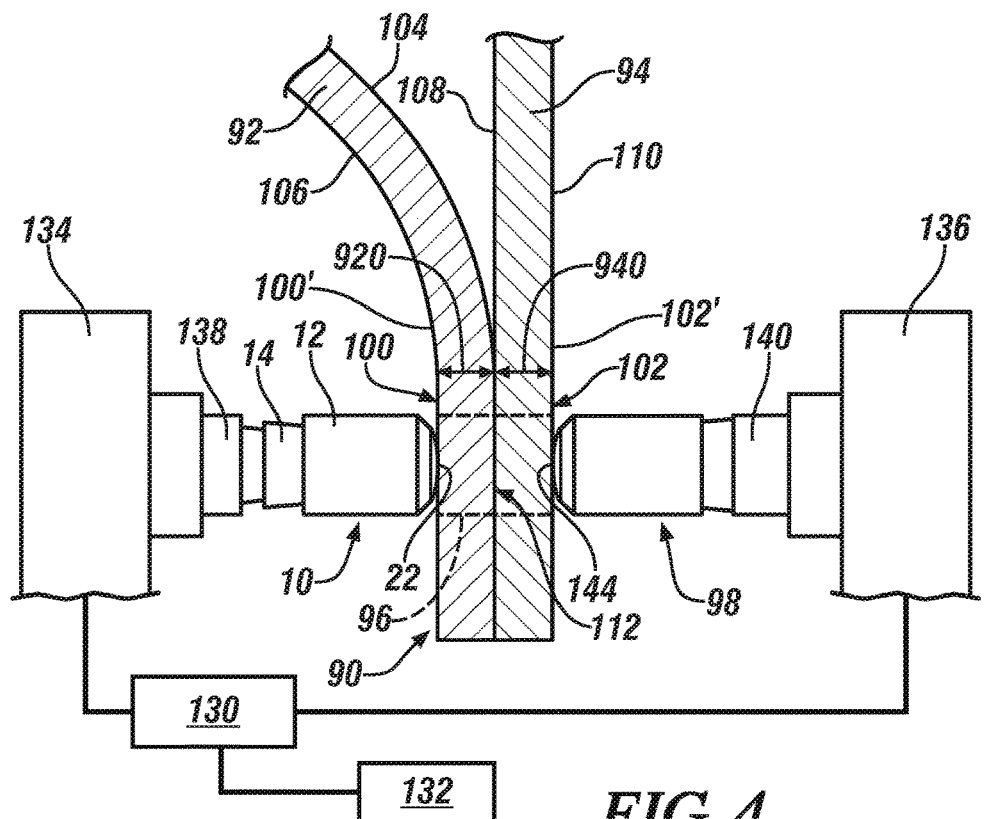
FIG. 4 is a general cross-sectional view of a workpiece stack-up, which includes an aluminum workpiece and an adjacent steel workpiece assembled in overlapping fashion, situated between a welding electrode according to the present disclosure and another welding electrode in preparation for resistance spot welding.

The workpiece stack-up 90 is illustrated in FIG. 4 along with the welding electrode 10 described above (hereafter referred to as the "first welding electrode" for purposes of identification) and a second welding electrode 98 that are mechanically and electrically configured on a weld gun (partially shown). The workpiece stack-up 90 has a first side 100 provided by an aluminum workpiece surface 100' and a second side 102 provided by a steel workpiece surface 102'. The two sides 100, 102 of the workpiece stack-up 90 are accessible to the set of welding electrodes 10, 98, respectively, at the weld site 96; that is, the first welding electrode 10 is arranged to make contact with and be pressed against the first side 100 of the workpiece stack-up 90 while the second welding electrode 98 is arranged to make contact with and be pressed against the second side 102. And while only one weld site 96 is depicted in the Figures, skilled artisans will appreciate that spot welding may be practiced with the first and second welding electrodes 10, 98 according to the disclosed method at multiple different weld sites 96 on the same stack-up 90.

The aluminum workpiece 92 includes an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer of a refractory oxide material comprised of aluminum oxide compounds and possibly other oxide compounds as well, such as magnesium oxide compounds if, for example, the aluminum substrate is an aluminum-magnesium alloy. Such a refractory oxide material may be a native oxide coating that forms naturally when the aluminum substrate is exposed to air and/or an oxide layer created during exposure of the aluminum substrate to elevated temperatures during manufacture, e.g., a mill scale. The aluminum substrate may also be coated with a layer of zinc, tin, or a metal oxide conversion coating comprised of oxides of titanium, zirconium, chromium, or silicon, as described in US Pat. Pub. No. 2014/0360986. The surface layer may have a thickness ranging from 1 nm to 10 µm and may be present on each side of the aluminum substrate. Taking into account the thickness of the aluminum substrate and any optional surface layer that may be present, the aluminum workpiece 92 has a thickness 920 that ranges from 0.3 mm to about 6.0 mm, or more narrowly from 0.5 mm to 3.0 mm, at least at the weld site 96.

The aluminum substrate of the aluminum workpiece 92 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si—Mg aluminum die casting alloy. The aluminum substrate may further be employed in a variety of tempers including annealed (O), strain hardened (H), and solution heat treated (T), if desired. The term "aluminum workpiece" as used herein thus encompasses unalloyed aluminum and a wide variety of aluminum alloys, whether coated or uncoated, in different spot-weldable forms including wrought sheet layers, extrusions, forgings, etc., as well as castings.

The steel workpiece 94 includes a steel substrate from any of a wide variety of strengths and grades that is either coated or uncoated. The steel substrate may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 94 includes press-hardened steel (PHS). Preferred compositions of the steel substrate, however, include mild steel, dual phase steel, and boron steel used in the manufacture of press-hardened steel. Those three types of steel have ultimate tensile strengths that, respectively, range from 150 MPa to 350 MPa, from 500 MPa to 1100 MPa, and from 1200 MPa to 1800 MPa.

The steel workpiece 94 may include a surface layer on one side or both sides of the steel substrate. If a surface layer is present, the steel substrate preferably includes a surface layer of zinc (galvanized), a zinc-iron alloy (galvanneal), a zinc-nickel alloy, nickel, aluminum, an aluminum-magnesium alloy, an aluminum-zinc alloy, or an aluminum-silicon alloy, any of which may have a thickness of up to 50 µm and may be present on each side of the steel substrate. Taking into account the thickness of the steel substrate and any surface layer that may be present, the steel workpiece 94 has a thickness 940 that ranges from 0.3 mm and 6.0 mm, or more narrowly from 0.6 mm to 2.5 mm, at least at the weld site 96. The term "steel workpiece" as used herein thus encompasses a wide variety of steels, whether coated or uncoated, of different grades and strengths.

When the two workpieces 92, 94 are stacked-up for spot welding in the context of a "2T" stack-up embodiment, which is illustrated in FIG. 4, the aluminum workpiece 92 and the steel workpiece 94 present the first and second sides 100, 102 of the workpiece stack-up 90, respectively. In particular, the aluminum workpiece 92 includes a faying surface 104 and a back surface 106 and, likewise, the steel workpiece 94 includes a faying surface 108 and a back surface 110. The faying surfaces 104, 108 of the two workpieces 92, 94 overlap and confront one another to establish a faying interface 112 that extends through the weld site 96. The back surfaces 106, 110 of the aluminum and steel workpieces 92, 94, on the other hand, face away from one another in opposite directions at the weld site 96 and constitute, respectively, the aluminum workpiece surface 100' and the steel workpiece surface 102' of the first and second sides 100, 102 of the workpiece stack-up 90.

The term "faying interface 112" is used broadly in the present disclosure and is intended to encompass any overlapping and confronting relationship between the faying surfaces 104, 108 of the workpieces 92, 94 in which resistance spot welding can be practiced. The faying surfaces 104, 108, for example, may be in direct contact with each other such that they physically abut and are not separated by a discrete intervening material layer. As another example, the faying surfaces 104, 108 may be in indirect contact with each other such as when they are separated by a discrete intervening material layer—and thus do not experience the type of interfacial physical abutment found in direct contact—yet are in close enough proximity to each other that resistance spot welding can still be practiced. This type of indirect contact between the faying surfaces 104, 108 of the aluminum and steel workpieces 92, 94 typically results when an intermediate organic material layer (not shown) is applied between the faying surfaces 104, 108 before the workpieces 92, 94 are stacked against each other during formation of the workpiece stack-up 90.

An intermediate organic material layer that may be present between the faying surfaces 104, 108 of the aluminum and steel workpieces 92, 94 is an adhesive layer that includes a structural thermosetting adhesive matrix. The structural thermosetting adhesive matrix may be any curable structural adhesive including, for example, as a heat-curable epoxy or a heat-curable polyurethane. Some specific examples of heat-curable structural adhesives that may be used as the adhesive matrix include DOW Betamate 1486, Henkel Terokal 5089, and Uniseal 2343, all of which are commercially available. Additionally, the adhesive layer may further include optional filler particles, such as silica particles, dispersed throughout the thermosetting adhesive matrix to modify the viscosity profile or other properties of the adhesive layer for manufacturing operations. The intermediate organic material layer, whether an adhesive layer or some other organic material, such as a sealer or soundproofing layer, preferably has a thickness through the weld site 96 that ranges from 0.1 mm to 2.0 mm or, more narrowly, from 0.2 mm to 1.0 mm.

The intermediate organic material layer, if present, can be spot welded through rather easily at the temperatures and electrode clamping pressures attained at the weld site 96 during current flow. Under spot welding conditions, the organic material layer is laterally displaced and thermally decomposed within the site 96 during current flow to leave behind only residual materials (e.g., carbon ash, filler particles, etc.) near the faying surface 108 of the steel workpiece 94. Outside of the weld site 96, however, the intermediate organic material layer remains generally undisturbed. In that regard, if the intermediate organic material layer is an adhesive layer, as described above, the adhesive layer is available to provide additional bonding between the faying surfaces 104, 108 of the aluminum and steel workpieces 92, 94. To achieve such additional bonding, the workpiece stack-up 90 may be heated in an ELPO-bake oven or other heating apparatus following spot welding to cure the structural thermosetting adhesive matrix of the adhesive layer that is still intact around the weld site 96.

Figure 5:
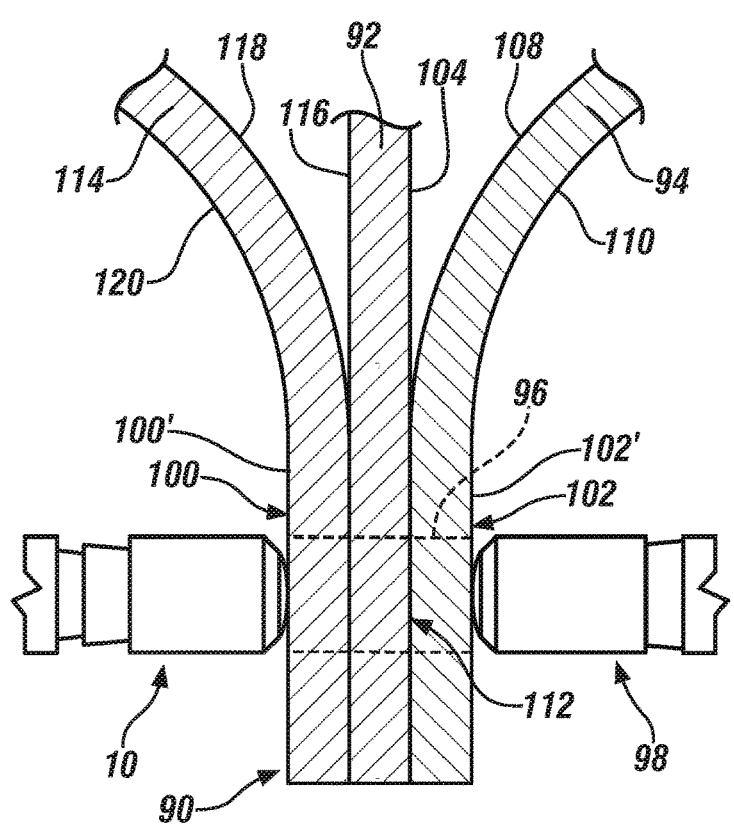
FIG. 5 is a general cross-sectional view of a workpiece stack-up, which includes an aluminum workpiece and an adjacent steel workpiece assembled in overlapping fashion, situated between a welding electrode according to the present disclosure and another welding electrode in preparation for resistance spot welding, although here the workpiece stack-up includes an additional aluminum workpiece (i.e., two aluminum workpieces and one steel workpiece) according to one embodiment of the disclosure.
Figure 6:
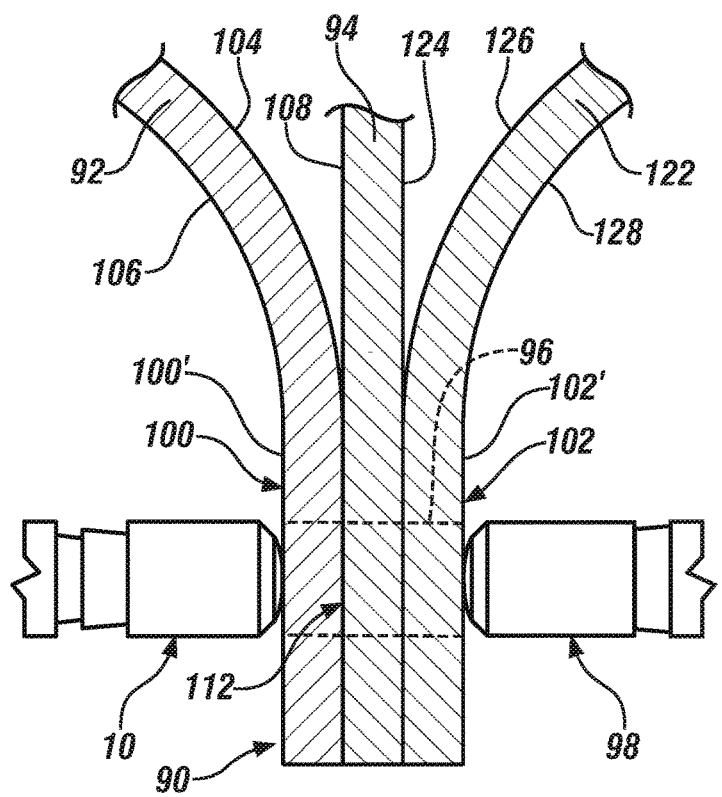
FIG. 6 is a general cross-sectional view of a workpiece stack-up, which includes an aluminum workpiece and an adjacent steel workpiece assembled in overlapping fashion, situated between a welding electrode according to the present disclosure and another welding electrode in preparation for resistance spot welding, although here the workpiece stack-up includes an additional steel workpiece (i.e., one aluminum workpiece and two steel workpieces) according to one embodiment of the disclosure.
Figure 7:
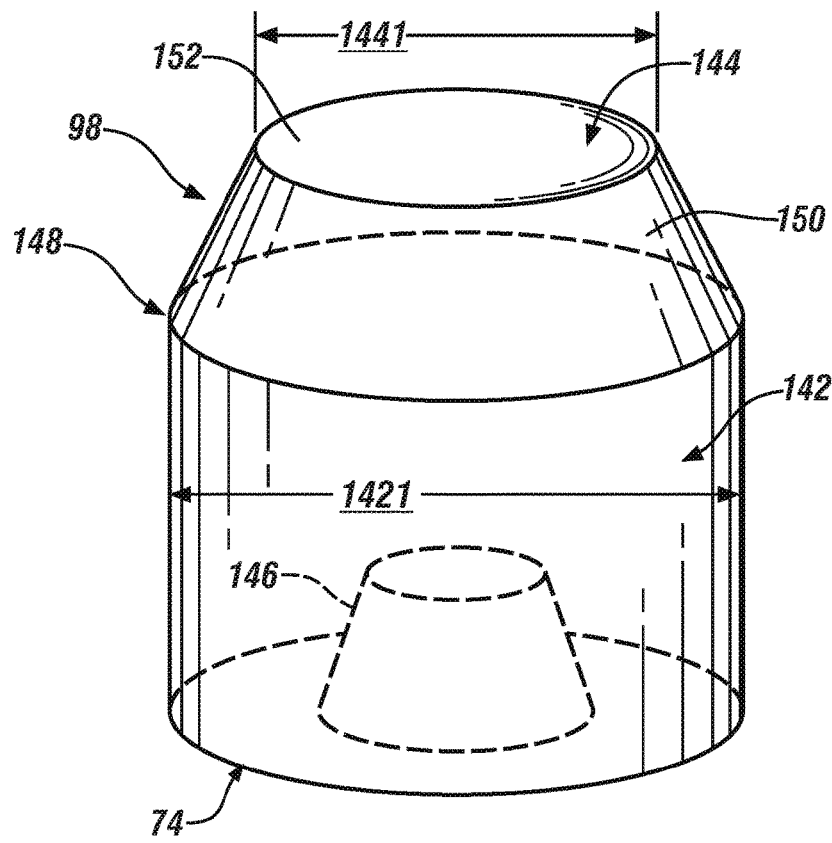
FIG. 7 is a general perspective view of the welding electrode depicted in FIG. 4 that may be used in conjunction with the first welding electrode (e.g., the welding electrode depicted in FIG. 1) to resistance spot weld the workpiece stack-up.

Of course, as shown in FIGS. 5-6, the workpiece stack-up 90 is not limited to the inclusion of only the aluminum workpiece 92 and the adjacent steel workpiece 94. The workpiece stack-up 90 may also include at least an additional aluminum workpiece or an additional steel workpiece—in addition to the adjacent aluminum and steel workpieces 92, 94—so long as the additional workpiece is disposed adjacent to the workpiece 92, 94 of the same base metal composition; that is, any additional aluminum workpiece is disposed adjacent to the aluminum workpiece 92 and any additional steel workpiece is disposed adjacent to the steel workpiece 94. As for the characteristics of the additional workpiece, the descriptions of the aluminum workpiece 92 and the steel workpiece 94 provided above are applicable to any additional aluminum or steel workpiece that may be included in the workpiece stack-up 90. It should be noted, though, that while the same general descriptions apply, there is no requirement that the additional aluminum workpiece(s) and/or the additional steel workpiece(s) be identical in terms of composition, thickness, or form (e.g., wrought or cast) to the aluminum workpiece 92 and the steel workpiece 94, respectively, that lie next to each other within the workpiece stack-up 90.

As shown in FIG. 5, for example, the workpiece stack-up 90 may include the adjacent aluminum and steel workpieces 92, 94 described above along with an additional aluminum workpiece 114. Here, as shown, the additional aluminum workpiece 114 overlaps the adjacent aluminum and steel workpieces 92, 94 and lies next to the aluminum workpiece 92. When the additional aluminum workpiece 114 is so positioned, the back surface 110 of the steel workpiece 94 constitutes the steel workpiece surface 102' that provides the second side 102 of the workpiece stack-up 90, as before, while the aluminum workpiece 92 that lies adjacent to the steel workpiece 94 now includes a pair of opposed faying surfaces 104, 116. The faying surface 104 of the aluminum workpiece 92 that faces the faying surface 108 of the steel workpiece 94 continues to establish the faying interface 112 between the two workpieces 92, 94 as previously described. The other faying surface 116 of the aluminum workpiece 92 overlaps and confronts a faying surface 118 of the additional aluminum workpiece 114. As such, in this particular arrangement of lapped workpieces 92, 94, 114, a back surface 120 of the additional aluminum workpiece 114 now constitutes the aluminum workpiece surface 100' that provides the first side 100 of the workpiece stack-up 90.

In another example, as shown in FIG. 6, the workpiece stack-up 90 may include the adjacent aluminum and steel workpieces 92, 94 described above along with an additional steel workpiece 122. Here, as shown, the additional steel workpiece 122 overlaps the adjacent aluminum and steel workpieces 92, 94 and lies next to the steel workpiece 94. When the additional steel workpiece 122 is so positioned, the back surface 106 of the aluminum workpiece 92 constitutes the aluminum workpiece surface 100' that provides the first side 100 of the workpiece stack-up 90, as before, while the steel workpiece 94 that lies adjacent to the aluminum workpiece 92 now includes a pair of opposed faying surfaces 108, 124. The faying surface 108 of the steel workpiece 94 that faces the faying surface 104 of the aluminum workpiece 92 continues to establish the faying interface 112 between the two workpieces 92, 94 as previously described. The other faying surface 124 of the steel workpiece 94 overlaps and confronts a faying surface 126 of the additional steel workpiece 122. As such, in this particular arrangement of lapped workpieces 92, 94, 122, a back surface 128 of the additional steel workpiece 122 now constitutes the steel workpiece surface 102' that provides the second side 102 of the workpiece stack-up 90.

Returning back to FIG. 4, the first welding electrode 10 and the second welding electrode 98 are used to pass electrical current through the workpiece stack-up 90 and across the faying interface 112 of the adjacent aluminum and steel workpieces 92, 94 at the weld site 96 regardless of whether an additional aluminum and/or steel workpiece is present. Each of the welding electrodes 10, 98 is carried by a weld gun (partially shown) of any suitable type including a C-type or an X-type weld gun. The spot welding operation may call for the weld gun to be mounted to a robot capable of moving the weld gun around the workpiece stack-up 90 as needed, or it may call for the weld gun to be configured as a stationary pedestal-type in which the workpiece stack-up 90 is manipulated and moved relative to the weld gun. Additionally, as illustrated schematically here, the weld gun may be associated with a power supply 130 that delivers electrical current between the welding electrodes 10, 98 according to a programmed weld schedule administered by a weld controller 132. The weld gun may also be fitted with coolant lines and associated control equipment in order to deliver a coolant fluid, such as water, to each of the welding electrodes 10, 98 during spot welding operations.

The weld gun includes a first gun arm 134 and a second gun arm 136. The first gun arm 134 is fitted with a shank 138 that secures and retains the first welding electrode 10 and the second gun arm 136 is fitted with a shank 140 that secures and retains the second welding electrode 98. The secured retention of the welding electrodes 10, 98 on their respective shanks 138, 140 can be accomplished by way of shank adapters that are located at axial free ends of the shanks 138, 140 and received by the electrodes 10, 98 as shown and described with respect to FIG. 1. In terms of their positioning relative to the workpiece stack-up 90, the first welding electrode 10 is positioned for contact with the first side 100 of the stack-up 90, and, consequently, the second welding electrode 98 is positioned for contact with the second side 102 of the stack-up 90. The first and second weld gun arms 134, 136 are operable to converge or pinch the welding electrodes 10, 98 towards each other and to impose a clamping force on the workpiece stack-up 90 at the weld site 96 once the electrodes 10, 98 are brought into contact with their respective workpiece stack-up sides 100, 102.

The second welding electrode 98 employed opposite the first welding electrode 10 can be any of a wide variety of electrode designs. Generally, as shown best in FIG. 7, the second welding electrode 98 includes an electrode body 142 and a weld face 144. The electrode body 142 is preferably cylindrical in shape and includes an accessible internal recess 146 for insertion of, and attachment with, a shank adapter (not shown) of the shank 140 associated with the second gun arm 136. A front end 148 of the electrode body 142 has a diameter 1421 that lies within the range of 12 mm to 22 mm or, more narrowly, within the range of 16 mm to 20 mm. The weld face 144 is disposed on the front end 148 of the body 142 and may be upwardly displaced from the front end 148 by a transition nose 150 or it may transition directly from the front end 148 (termed a "full face electrode"). Moreover, if a transition nose 150 is present, the weld face 144 may be upwardly displaced from the front end by a distance of 2 mm to 10 mm. The transition nose 150 is preferably frustoconical or truncated spherical in shape. If frustoconical, the angle of truncation of the nose 150 is preferably between 15° and 50° from a horizontal plane of the weld face 144. If truncated spherical, the radius of curvature of the nose 32 is preferably between 6 mm and 12 mm.

The weld face 144 is the portion of the second welding electrode 98 that makes contact with the second side 102 of the workpiece stack-up 90. The weld face 144 preferably has a diameter 1441 that lies within the range of 3 mm to 22 mm or, more narrowly, within the range of 4 mm to 15 mm. In terms of its profile, the weld face 144 includes a base weld face surface 152 that may be planar or convexly domed. If convexly domed, the base weld face surface 152 ascends from an outer circumference of the weld face 144 and, in one embodiment, may have a spherical profile with a radius of curvature that lies within the range of 6 mm to 400 mm or, more narrowly, within the range of 8 mm to 100 mm. The base weld face surface 152 may be smooth or it may include raised surface features such as a plateau surface that is positively displaced above the base weld face surface 152 about the center of the weld face 144, a rounded projection that rises above the base weld face surface 152 about the center of the weld face 144, a plurality of upstanding circular ridges similar to those described above, or some other raised feature.

The second welding electrode 98 may be constructed from any electrically and thermally conductive material suitable for spot welding applications. For example, the second welding electrode 98 may be constructed from a copper alloy having an electrical conductivity of at least 75% IACS, or more preferably at least 90% IACS, and a thermal conductivity of at least 300 W/mK, or more preferably at least 350 W/mK. One specific example of a copper alloy that may be used for the second welding electrode 98 is a copper-zirconium alloy (CuZr) that contains about 0.10 wt % to about 0.20 wt % zirconium and the balance copper. Copper alloys that meet this constituent composition and are designated C15000 are generally preferred. Other copper compositions such as a copper-chromium alloy, a copper-chromium-zirconium alloy, or copper with an aluminum oxide dispersion may also be used. Still further, other metal compositions not explicitly recited here that possess suitable mechanical properties as well as electrical and thermal conductivity properties may be employed.

The resistance spot welding method will now be described with reference to FIGS. 4 and 8-11, which depict only the aluminum and steel workpieces 92, 94 that overlap and lie adjacent to one another so as to establish the faying interface 112. The presence of additional workpieces in the workpiece stack-up 90 including, for example, the additional aluminum or steel workpieces 114, 122 described above, does not affect how the spot welding method is carried out or have any substantial effect on the joining mechanism that takes place at the faying interface 112 of the adjacent aluminum and steel workpieces 92, 94. The more-detailed discussion provided below thus applies equally to instances in which the workpiece stack-up 90 is a "3T" stack-up that includes the additional aluminum workpiece 114 (FIG. 5) or the additional steel workpiece 122 (FIG. 6), as well as "4T" stack-ups, despite the fact that those additional workpieces are not expressly illustrated in FIGS. 4 and 8-11.

At the onset of the resistance spot welding method, which is depicted in FIG. 4, the workpiece stack-up 90 is provided by first assembling the aluminum and steel workpieces 92, 94 into the workpiece stack-up 90 by aligning and stacking the workpieces 92, 94 together in a lapped configuration using a fixturing apparatus or some other suitable device. The workpiece stack-up 90 is then located between the first welding electrode 10 and the opposed second welding electrode 98. The weld face 22 of the first welding electrode 10 is positioned to contact the aluminum workpiece surface 100' of the first side 100 of the stack-up 90 and the weld face 144 of the second welding electrode 98 is positioned to contact the steel workpiece surface 102' of the second side 102. The weld gun is then operated to converge the first and second welding electrodes 10, 98 relative to one another so that their respective weld faces 22, 144 are pressed against the opposite first and second sides 100, 102 of the stack-up 90 at the weld site 96. The weld faces 22, 144 are typically facially aligned with each other at the weld site 96 under a clamping force imposed on the workpiece stack-up 90. The imposed clamping force preferably ranges from 400 lbf (pounds force) to 2000 lbf or, more narrowly, from 600 lbf to 1300 lbf.

After the weld faces 22, 144 of first and second welding electrodes 10, 98 are pressed against the first and second sides 100, 102 of the workpiece stack-up 90, respectively, electrical current is passed between the facially aligned weld faces 22, 144. The electrical current exchanged between the weld faces 22, 144 is preferably a DC (direct current) electrical current that is delivered by the power supply 130 which, as shown, electrically communicates with the first and second welding electrodes 10, 98. The power supply 130 is preferably a medium-frequency direct current (MFDC) inverter power supply that includes a MFDC transformer. A MFDC transformer can be obtained commercially from a number of suppliers including Roman Manufacturing (Grand Rapids, Mich.), ARO Welding Technologies (Chesterfield Township, Mich.), and Bosch Rexroth (Charlotte, N.C.). The characteristics of the delivered electrical current are controlled by the weld controller 132. Specifically, the weld controller 132 allows a user to program a weld schedule that sets the waveform of the electrical current being exchanged between the welding electrodes 10, 98. The weld schedule allows for customized control of the current level at any given time and the duration of current flow at any given current level, among others, and further allows for such attributes of the electrical current to be responsive to changes in very small time increments down to fractions of a millisecond.

Figure 8:
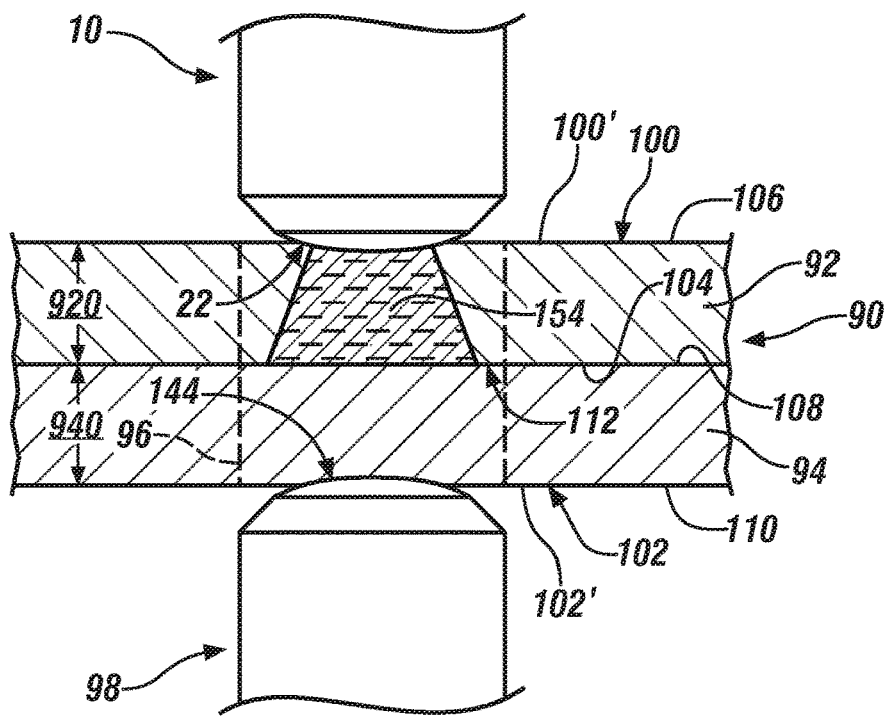
FIG. 8 is a general cross-sectional view of the workpiece stack-up and welding electrodes shown in FIG. 4 during passage of electrical current between the welding electrodes and through the stack-up, wherein the passage of electrical current has caused melting of the aluminum workpiece that lies adjacent to the steel workpiece and the creation of a molten aluminum weld pool within the aluminum workpiece.

The electrical current exchanged between the welding electrodes 10, 98 passes through the workpiece stack-up 90 and across the faying interface 112 established between the adjacent aluminum and steel workpieces 92, 94. The exchanged electrical current may be constant or pulsed over time, or some combination of the two, and typically has a current level that ranges from 5 kA and 50 kA and lasts for an overall duration of 40 ms to 2,500 ms. Resistance to this flow of electrical current generates heat and eventually melts the aluminum workpiece 92 to create a molten aluminum weld pool 154 within the aluminum workpiece 92, as depicted in FIG. 8. The molten aluminum weld pool 154 wets the adjacent faying surface 108 of the steel workpiece 94 and extends into the aluminum workpiece 92 towards the back surface 106. The molten aluminum weld pool 154 may penetrate a distance into the aluminum workpiece 92 that ranges from 20% to 100% of the thickness 920 of the aluminum workpiece 92 at the weld site 96. And, in terms of its composition, the molten aluminum weld pool 154 is composed predominantly of aluminum material derived from the aluminum workpiece 92.

Figure 9:
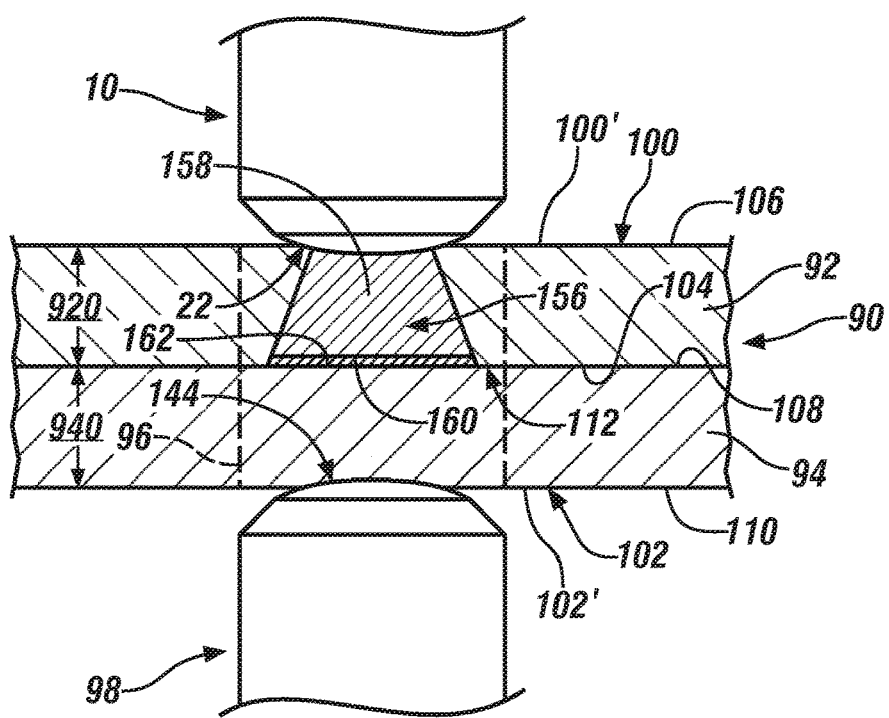
FIG. 9 is a general cross-sectional view of the workpiece stack-up and welding electrodes shown in FIG. 4 after passage of the electrical current between the welding electrodes and through the stack-up has terminated so as to allow the molten aluminum weld pool to solidify into a weld joint that bonds the adjacent pair aluminum and steel workpieces together.

The molten aluminum weld pool 154 solidifies into a weld joint 156 that weld bonds the aluminum and steel workpieces 92, 94 together, as shown in FIG. 9, upon termination of the passage of electrical current between the weld faces 22, 144 of the first and second welding electrodes 10, 98. The weld joint 156 includes an aluminum weld nugget 158 comprised of resolidified material of the aluminum workpiece 92, and may also include an intermetallic layer 160. The aluminum weld nugget 158 extends into the aluminum workpiece 92 to a distance that often ranges from 20% to 100% of the thickness 920 of the aluminum workpiece 92 at the weld site 96, just like the pre-existing molten aluminum weld pool 154. The intermetallic layer is depicted here as a single monolithic idealized layer (with an exaggerated thickness) that is situated between the aluminum weld nugget 158 and the faying surface 108 of the steel workpiece 94. The intermetallic layer 160 is produced due to a reaction between the molten aluminum weld pool 154 and the steel workpiece 94 at spot welding temperatures, and typically includes $FeAl_3$ compounds, $Fe_2Al_5$ compounds, and possibly other iron-aluminum (Fe—Al) intermetallic compounds, and may exhibit a thickness of 1 µm to 5 µm.

The weld joint 156 is expected to have enhanced strength—in particular enhanced peel and cross-tension strength—compared to weld joints formed according to conventional spot welding practices. The enhanced strength can be attributed to the structure of the first welding electrode 10 and its ability to minimize the unwanted dispersion of weld defects within the weld joint 156 at and along a bonding interface 162 of the weld joint 156 and the faying surface 108 of the steel workpiece 94. In particular, the structure of the first welding electrode 10 alters the solidification behavior of the molten aluminum weld pool 154 as it transitions into the weld joint 156 in a way that causes weld defects to be carried towards the center of the weld joint 156 and away from the outer edge of the joint 156. Directing weld defects towards the center of the weld joint 156 is believed to have a favorable impact on both peel and cross-tension strength since the center of the weld joint 156 is a more innocuous location for weld defects to be present than at the outer edge of the joint 156 near the bonding interface 162 and adjacent to the notch root that surrounds the weld joint 156.

Figure 10:
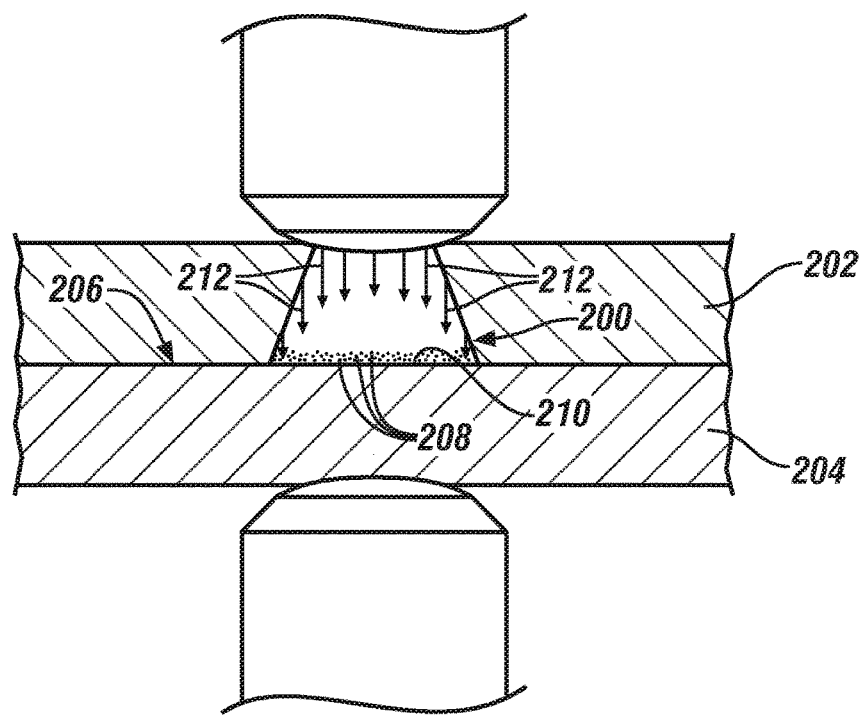
FIG. 10 illustrates the direction of the solidification front in a molten aluminum weld pool that solidifies from the point nearest the colder welding electrode located proximate the aluminum workpiece towards the faying surface of the steel workpiece as is common in conventional spot welding practices.
Figure 11:
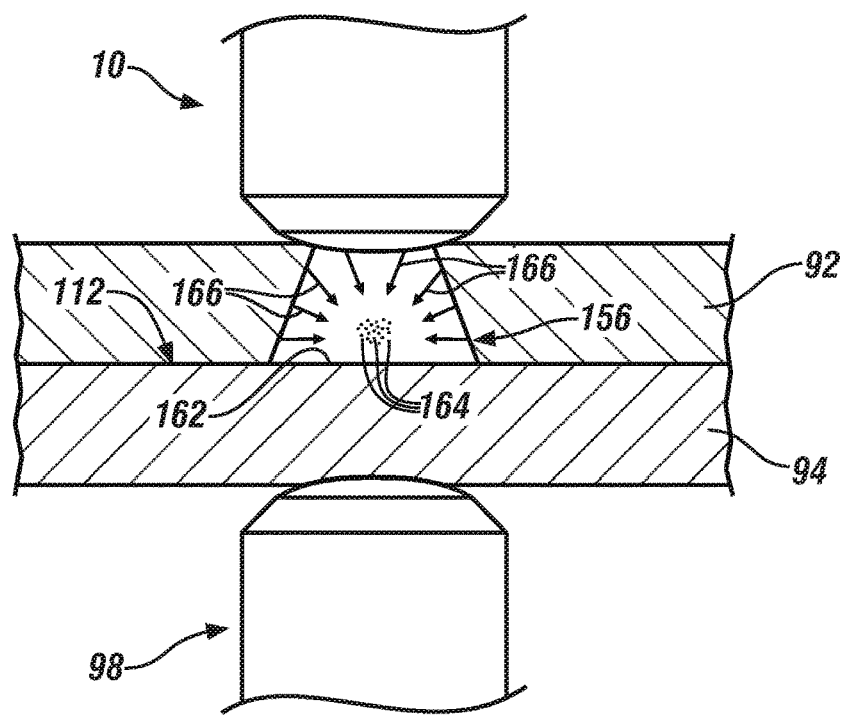
FIG. 11 illustrates the direction of the solidification front in a molten aluminum weld pool that solidifies from its outer perimeter towards its center as a result of using the welding electrode of the present disclosure.

The influence that the structure of the first welding electrode 10 has on the solidification behavior of the molten aluminum weld pool 154 is represented generally in FIGS. 10-11. To provide some context, FIG. 10 depicts a weld joint 200 formed between an aluminum workpiece 202 and a steel workpiece 204 that overlap to establish a faying interface 206. The weld joint 200 illustrated here is representative of a weld joint formed by a conventional resistance spot welding process that does not use the first welding electrode 10 described above. As can be seen, weld defects 208 are dispersed at and along a bonding interface 210 of the weld joint 200 and the faying surface of the steel workpiece 204. These weld defects 208 may include shrinkage voids, gas porosity, residual oxide film fragments, and micro-cracking, among others. When present and distributed along the bonding interface 210, the weld defects 208 may reduce the peel and cross-tension strength of the weld joint 200 and, more generally, may negatively impact and weaken the overall integrity of the joint 200.

Without being bound by theory, it is believed that the dispersion of weld defects 208 at and along the bonding interface 210 is due at least in part to the solidification behavior of the pre-existing molten aluminum weld pool as it transforms into the weld joint 200. Specifically, a heat imbalance can develop between the much hotter steel workpiece 204 and the aluminum workpiece 202 because of the dissimilar properties of the two materials—namely, the much greater thermal and electrical resistivities of the steel. The steel workpiece 204 therefore acts as a heat source while the aluminum workpiece 202 acts as a heat conductor, creating a strong temperature gradient in the vertical direction that causes the molten aluminum weld pool to cool and solidify from the region nearest the cooler (e.g., water cooled) welding electrode proximate the aluminum workpiece 202 towards the steel workpiece 204. The path and direction of the solidification front is represented in FIG. 10 by arrows 212. As the solidification front progresses along path 212, the weld defects 208 are driven toward the bonding interface 210 of the weld joint 200 and the steel workpiece 204 and eventually end up dispersed along the bonding interface 210 throughout weld joint 200.

The structure of the first welding electrode 10 can avoid the solidification behavior shown in FIG. 10 and the proliferation of weld defects that results. Referring now to FIG. 11, an illustration of the weld joint 156 formed according to the spot welding method described above is shown. As can be seen, weld defects 164 in this weld joint 156 are congregated near the center of the joint 156 as opposed to being more dispersed along the bonding interface 162 as depicted in FIG. 10. The weld defects 164 are swept towards the center of the weld joint 156 because the structure of the first welding electrode 10 modifies heat flow and causes the molten aluminum weld pool 154 to solidify from its outer perimeter towards its center. The path and direction of the solidification front is represented generally in FIG. 11 by arrows 166. The path 166, here, can drive weld defects 164 into the center of the weld joint 156, either on or displaced from the bonding interface 162, and can further consolidate the defects 164 into larger-sized defects.

The structure of the first welding electrode 10 induces the solidification front 166 shown in FIG. 11 because the electrode 10, and more specifically the weld face 22 on the front end wall 18, retains heat for an extended period of time within the underlying portion of the aluminum workpiece 92 following termination of current flow. In fact, the center of the weld face 22 cools slower than the perimeter of the weld face 22 as a consequence of heat flowing into the peripheral side wall 20 through the perimeter of the weld face 22. Such heat retention and heat flow paths change the temperature distribution within the weld site 96 by creating three-dimensional radial temperature gradients around the molten aluminum weld pool 154 or enlarging already-existing three-dimensional radial temperature gradients. These new and/or enlarged radial temperature gradients slow directional heat flow into the first welding electrode 10 from the molten aluminum weld pool 156 and, thus, promote lateral heat flow into the aluminum and steel workpieces 92, 94. The resultant improved lateral heat distribution causes the weld pool 154 to solidify inwards from its outer perimeter towards a center region. In this way, weld defects such as shrinkage voids, gas voids, micro-cracks, and residual oxide film fragments are driven toward and retained at the center of the weld joint 156, as shown, where they are less likely to adversely affect the strength of the joint 156.

Returning back to FIG. 9, the first and second welding electrodes 10, 98 continue to exert the clamping force on the workpiece stack-up 90 until the molten aluminum weld pool 154 has fully solidified into the weld joint 156. Once the weld joint 156 is formed, the clamping force imposed on the workpiece stack-up 90 is relieved and the first and second welding electrodes 10, 98 are retracted away from their respective sides 100, 102 of the stack-up 90. The workpiece stack-up 90 may now be moved relative to the weld gun so that the first and second welding electrodes 10, 98 are positioned in facing alignment at another weld site 96 where the spot welding method is repeated. Or, rather than undergoing spot welding at a different site 96, the workpiece stack-up 90 may be moved away from the weld gun to make room for another workpiece stack-up 90. The spot welding method can thus be carried out many times at different weld sites 96 on the same or different workpiece stack-up in a manufacturing setting where spot weld cycle times and product throughput are metrics that command significant attention.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A welding electrode for use in spot welding operations, the welding electrode comprising:
   an electrode welding shell that includes a front end wall and a peripheral side wall, the front end wall exteriorly comprising a weld face and the peripheral side wall extending rearwards from the front end wall; and
   a blind adapter joined to the peripheral side wall of the electrode welding shell such that the electrode welding shell and the blind adapter cooperate to define an internal cavity, the blind adapter having an axially closed front wall and a peripheral side wall that extends away from the axially closed front wall to define an internal recess, the axially closed front wall of the blind adapter being surrounded by the peripheral side wall of the electrode welding shell and having an exterior front surface that partially defines the internal cavity;
   wherein the welding electrode is supported on an electrode shank adapter that includes an outer casing received in the internal recess of the blind adapter, the outer casing of the electrode shank adapter having a front end that, along with a part of an interior side surface of the internal recess and a bottom surface of the internal recess, defines a cooling pocket, the outer casing of the electrode shank adapter further defining an internal bore through which a cooling fluid supply tube extends to introduce a cooling fluid into the cooling pocket, and wherein a volume of the internal cavity is greater than a volume of the cooling pocket.

2. The welding electrode set forth in claim 1, wherein the electrode welding shell and the blind adapter are integrally formed.

3. The welding electrode set forth in claim 1, wherein the electrode welding shell and the blind adapter are distinct components that are attached together.

4. The welding electrode set forth in claim 1, wherein the weld face includes a plurality of upstanding circular ridges that are centered about and surround an axis of the weld face, the upstanding circular ridges increasing in diameter from an innermost ridge that immediately surrounds the axis of the weld face to an outermost ridge farthest away from the axis of the weld face, and wherein each of the upstanding circular ridges has a closed circumference.

5. The welding electrode set forth in claim 1, wherein the peripheral side wall of the electrode welding shell extends rearwards away from the front end wall coaxially along an axis of the weld face.

6. The welding electrode set forth in claim 1, wherein each of the electrode welding shell and the blind adapter is constructed from a material having an electrical conductivity of at least 45% IACS and a thermal conductivity of at least 180 W/mK.

7. The welding electrode set forth in claim 1, wherein the internal cavity is vacant.

8. The welding electrode set forth in claim 1, wherein the internal cavity is filled with a low conductivity material that has an electrical conductivity and a thermal conductivity that are less than an electrical conductivity and a thermal conductivity of each of the electrode welding shell and the blind adapter.

9. A welding electrode for use in spot welding operations, the welding electrode comprising:
   an electrode welding shell that includes a front end wall and a peripheral side wall, the front end wall exteriorly comprising a weld face and further having an interior back surface opposite the weld face, the peripheral side wall extending rearwards from the front end wall to a back end and having an interior surface, and wherein the peripheral side wall of the electrode welding shell comprises a forward wall portion adjacent to the front end wall, a rearward wall portion adjacent to the back end of the electrode welding shell, and an intermediate wall portion that joins the forward wall portion and the rearward wall portion, the interior surface of the peripheral side wall of the electrode welding shell tapering within the rearward wall portion from an entrance of the back end towards the intermediate wall portion at a first taper angle, the interior surface of the peripheral side wall of the electrode welding shell further tapering within the intermediate wall portion from the rearward wall portion to the forward wall portion at a second taper angle that is greater than the first taper angle, and the interior surface of the peripheral side wall having a constant diameter within the forward wall portion as the interior surface extends from the intermediate wall portion to the interior back surface of the front end wall; and
   a blind adapter that includes an axially closed front wall and a peripheral side wall that extends away from the axially closed front wall to define an internal recess, the peripheral side wall of the blind adapter being joined to the peripheral side wall of the electrode welding shell such that the peripheral side wall of the blind adapter and the peripheral side wall of the electrode welding shell overlap and the axially closed front wall of the blind adapter is surrounded by the peripheral side wall of the electrode welding shell, wherein an exterior front end surface of the axially closed front wall of the blind adapter cooperates with the interior surface of the peripheral side wall of the electrode welding shell and the interior back surface of the front end wall of the electrode welding shell to define an internal cavity.

10. The welding electrode set forth in claim 9, wherein the electrode welding shell and the blind adapter are integrally formed.

11. The welding electrode set forth in claim 9, wherein the electrode welding shell and the blind adapter are distinct components that are attached together.

12. The welding electrode set forth in claim 11, wherein an exterior side surface of the peripheral side wall of the blind adapter is tapered to match that of the interior surface of the peripheral side wall of the electrode welding shell within the rearward portion in order to establish an interference fit between the electrode welding shell and the blind adapter.

13. The welding electrode set forth in claim 1, wherein the front end wall of the electrode welding shell has an interior back surface opposite the weld face, and the peripheral side wall has an interior surface, and wherein the peripheral side wall of the electrode welding shell comprises a forward wall portion adjacent to the front end wall, a rearward wall portion adjacent to the back end of the electrode welding shell, and an intermediate wall portion that joins the forward wall portion and the rearward wall portion, the interior surface of the peripheral side wall of the electrode welding shell tapering within the rearward wall portion from an entrance of the back end towards the intermediate wall portion at a first taper angle, the interior surface of the peripheral side wall of the electrode welding shell further tapering within the intermediate wall portion from the rearward wall portion to the forward wall portion at a second taper angle that is greater than the first taper angle, and the interior surface of the peripheral side wall having a constant diameter within the forward wall portion as the interior surface extends from the intermediate wall portion to the back surface of the front end wall.

14. The welding electrode set forth in claim 9, wherein the welding electrode is supported on an electrode shank adapter that includes an outer casing received in the internal recess of the blind adapter, the outer casing of the electrode shank adapter having a front end that, along with a part of an interior side surface of the blind adapter and a bottom surface of the blind adapter, defines a cooling pocket.

15. The welding electrode set forth in claim 14, wherein a volume of the internal cavity is greater than a volume of the cooling pocket.

\* \* \* \* \*